United States Patent
Tang et al.

(10) Patent No.: US 10,778,595 B2
(45) Date of Patent: Sep. 15, 2020

(54) OPERATING A MESSAGE QUEUE CLUSTER HAVING MULTIPLE NODES

(71) Applicant: INTERNATIONAL BUSINESS MACHINES CORPORATION, Armonk, NY (US)

(72) Inventors: Gang Tang, Nanjing (CN); Lei Bao, Wuxi (CN); Ming Shuang Xian, Wuxi (CN); Liang Rong, Suzhou (CN); Yuan Liang Miao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 16/177,587

(22) Filed: Nov. 1, 2018

(65) Prior Publication Data

US 2020/0145344 A1    May 7, 2020

(51) Int. Cl.
 *H04L 12/863* (2013.01)
 *H04L 12/803* (2013.01)
 *H04L 12/58* (2006.01)

(52) U.S. Cl.
 CPC ............ *H04L 47/62* (2013.01); *H04L 47/125* (2013.01); *H04L 51/00* (2013.01)

(58) Field of Classification Search
 CPC ........ H04L 47/62; H04L 47/125; H04L 51/00
 See application file for complete search history.

(56) References Cited

U.S. PATENT DOCUMENTS

| 8,861,527 | B1* | 10/2014 | Bao ..................... H04L 12/1836 370/392 |
| 9,195,511 | B2 | 11/2015 | Tung |
| 9,251,033 | B2 | 2/2016 | Kirchhofer |
| 9,654,566 | B2 | 5/2017 | Griffiths |
| 2008/0069008 | A1* | 3/2008 | Park ..................... H04W 64/00 370/254 |
| 2008/0107115 | A1* | 5/2008 | Cai ........................ G06F 9/544 370/392 |

(Continued)

FOREIGN PATENT DOCUMENTS

CN    103064731 A    4/2013

OTHER PUBLICATIONS

Klishin, "[RabbitMQ-Discuss] 3 Node RabbitMQ Cluster Behind the Load Balancer", Apr. 27, 2014, pp. 1-2.

(Continued)

*Primary Examiner* — Arvin Eskandarnia
(74) *Attorney, Agent, or Firm* — James W. Kappos

(57) ABSTRACT

Operating a message queue cluster having multiple nodes. A messaging request from a client is obtained by one or more processors, the messaging request to be routed to one of multiple nodes in a cluster. The one or more processors parse the messaging request to determine whether the messaging request should be routed to an other node. A messaging request is obtained from a client by one or more processors, the messaging request to be routed to one of multiple nodes in a cluster. The messaging request is parsed by one or more processors to determine whether the messaging request should be routed to an other of the multiple nodes in the cluster. The messaging request is routed by one or more processors in response to a determination that the messaging request should be routed to the other one of the multiple nodes in the cluster.

20 Claims, 6 Drawing Sheets

(56) References Cited

U.S. PATENT DOCUMENTS

| | | | | |
|---|---|---|---|---|
| 2009/0287805 | A1* | 11/2009 | Hawkins | H04L 51/00 |
| | | | | 709/223 |
| 2012/0039308 | A1* | 2/2012 | Kim | H04W 8/005 |
| | | | | 370/336 |
| 2016/0330147 | A1* | 11/2016 | Antebi | H04L 51/04 |
| 2016/0352867 | A1* | 12/2016 | Subbarayan | H04L 63/08 |
| 2017/0214737 | A1 | 7/2017 | Agarwal | |
| 2017/0257421 | A1 | 9/2017 | Agarwal | |
| 2019/0089799 | A1* | 3/2019 | Sathe | G06F 11/3476 |

OTHER PUBLICATIONS https://insidethecpu.com/2014/11/17/load-balancing-a-rabbitmq-cluster/, "Load Balancing a RabbitMQ Cluster", printed Sep. 13, 2018, pp. 1-31.

Openstack Foundation, "Scale-Out RabbitMQ Cluster Can Improve Performance While Keeping High Availability", https://www.youtube.com/watch?v=X3KUo8SKnt0, YouTube, printed Sep. 13, 2018, pp. 1-2.

Mell et al., "The NIST Definition of Cloud Computing", National Institute of Standards and Technology, Special Publication 800-145, Sep. 2011, pp. 1-7.

* cited by examiner

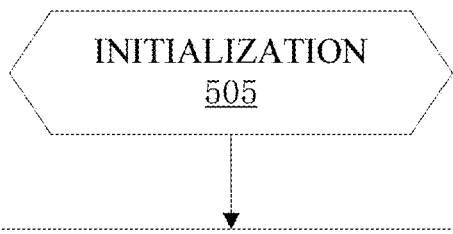

500

INITIALIZATION
505

OBTAIN A MESSAGING REQUEST FROM A CLIENT, WHEREIN THE MESSAGING REQUEST IS TO BE ROUTED TO ONE OF NODES IN A CLUSTER
510

PARSING THE MESSAGING REQUEST TO DETERMINE WHETHER THE MESSAGING REQUEST SHOULD BE ROUTED TO OTHER ONE OF THE NODES
520

CAUSING THE MESSAGING REUQEST TO BE ROUTED TO THE OTHER ONE OF THE NODES IN RESPONSE TO DETERMINING THAT THE MESSAGING REQUEST SHOULD BE ROUTED TO OTHER ONE OF THE NODES
530

*FIG. 5*

OPERATING A MESSAGE QUEUE CLUSTER HAVING MULTIPLE NODES

BACKGROUND

The present invention relates to message queue systems, and more specifically, to operating a message queue cluster having multiple nodes.

SUMMARY OF THE INVENTION

According to one embodiment of the present invention, a computer-implement method of operating a message queue cluster having multiple nodes is provided. The method comprises obtaining a messaging request from a client, wherein the messaging request is to be routed to one of multiple nodes in a cluster via an established channel between the client and one of the nodes. The method further comprises parsing the messaging request to determine whether the messaging request should be routed to an other one of the multiple nodes in the cluster. The method further comprises routing, by one or more processors, the messaging request to the other one of the multiple nodes in response to a determination that the messaging request should be routed to the other one of the multiple nodes in the cluster.

According to another embodiment of the present invention, a system for operating a message queue cluster having multiple nodes comprises one or more processors and a computer-readable memory coupled to the one or more processors. The computer-readable memory comprising instructions that when executed by the one or more processors perform action of obtaining a messaging request from a client, wherein the messaging request is to be routed to one of multiple nodes in a cluster via an established channel between the client and the one of the multiple nodes. The instructions further perform action of parsing the messaging request to determine whether the messaging request should be routed to an other one of the multiple nodes in the cluster. And the instructions perform further action of routing the messaging request to the other one of the multiple nodes in response to a determination that the messaging request should be routed to the other one of the multiple nodes in the cluster.

According to another embodiment of the present invention, a computer program product for operating a message queue cluster having multiple nodes comprises a computer readable storage medium having program instructions embodied therewith is provided. The program instructions are executable by a processor to cause the processor to perform action of obtaining a messaging request from a client, wherein the messaging request is to be routed to one of multiple nodes in a cluster via an established channel between the client and one of the multiple nodes. The program instructions are executable by a processor to cause the processor to perform further action of parsing the messaging request to determine whether the messaging request should be routed to an other one of the multiple nodes in the cluster. And the program instructions cause the processor to perform further action of routing the messaging request to the other one of the multiple nodes in response to a determination that the messaging request should be routed to the other one of the multiple nodes in the cluster.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 5 is a flowchart of the general process of a method according to an embodiment of the invention.

Throughout the drawings, same or similar reference numerals represent the same or similar elements.

DETAILED DESCRIPTION

Figure 1:
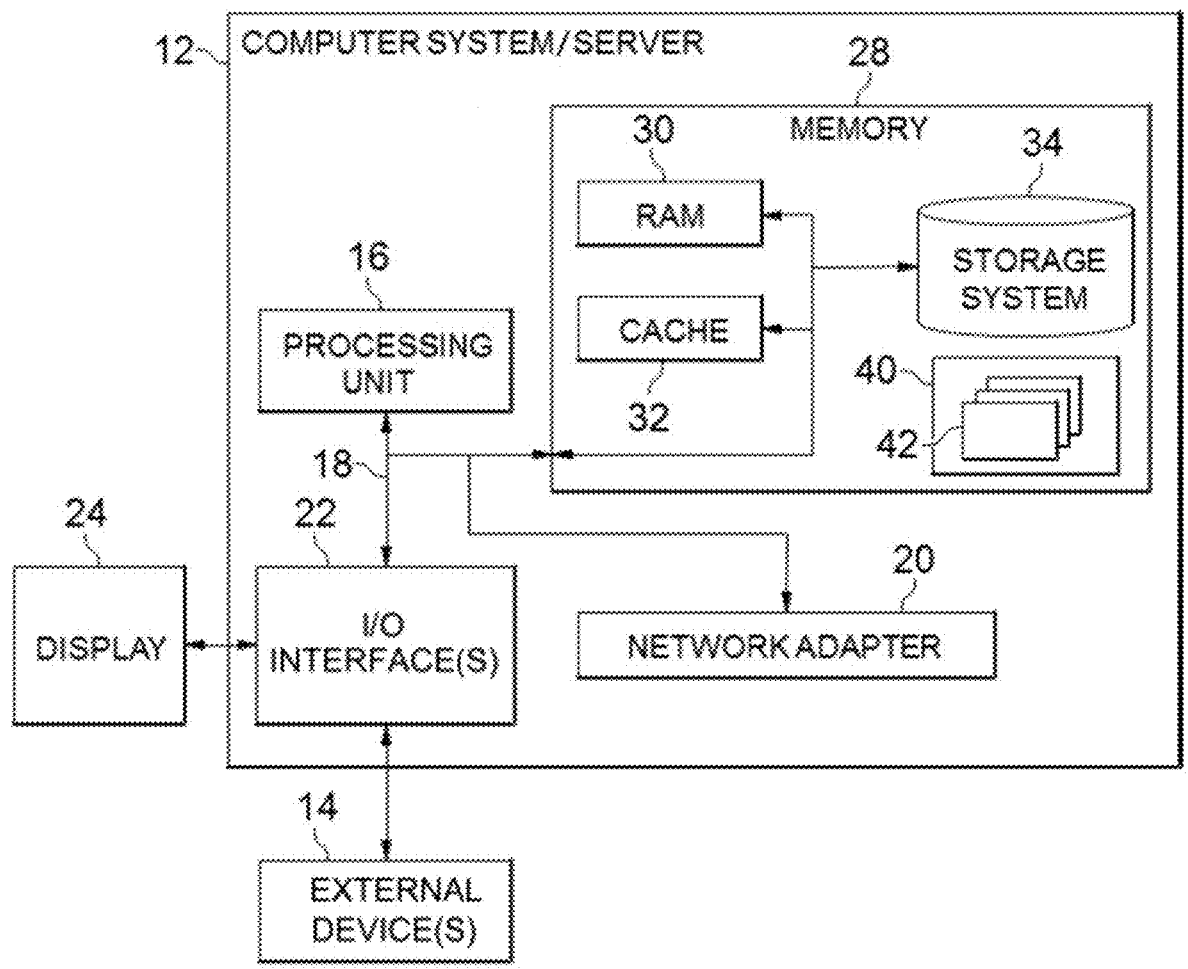
FIG. 1 depicts a cloud computing node according to an embodiment of the present invention.

Message queues provide an asynchronous communication mechanism that stores messages in a queue until a recipient retrieves them. Many message queue systems have been developed to implement a message queue, such as RabbitMQ™, Apache Kafka® and Sun® Open Message Queue and Tarantool®, and so on. Although such message queue systems have generally worked well in the past, there is always a desire for improvement.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a specific-purpose or general-purpose computing device. The components of computer system/server 12 may include, but are not limited to, one or more processors or processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
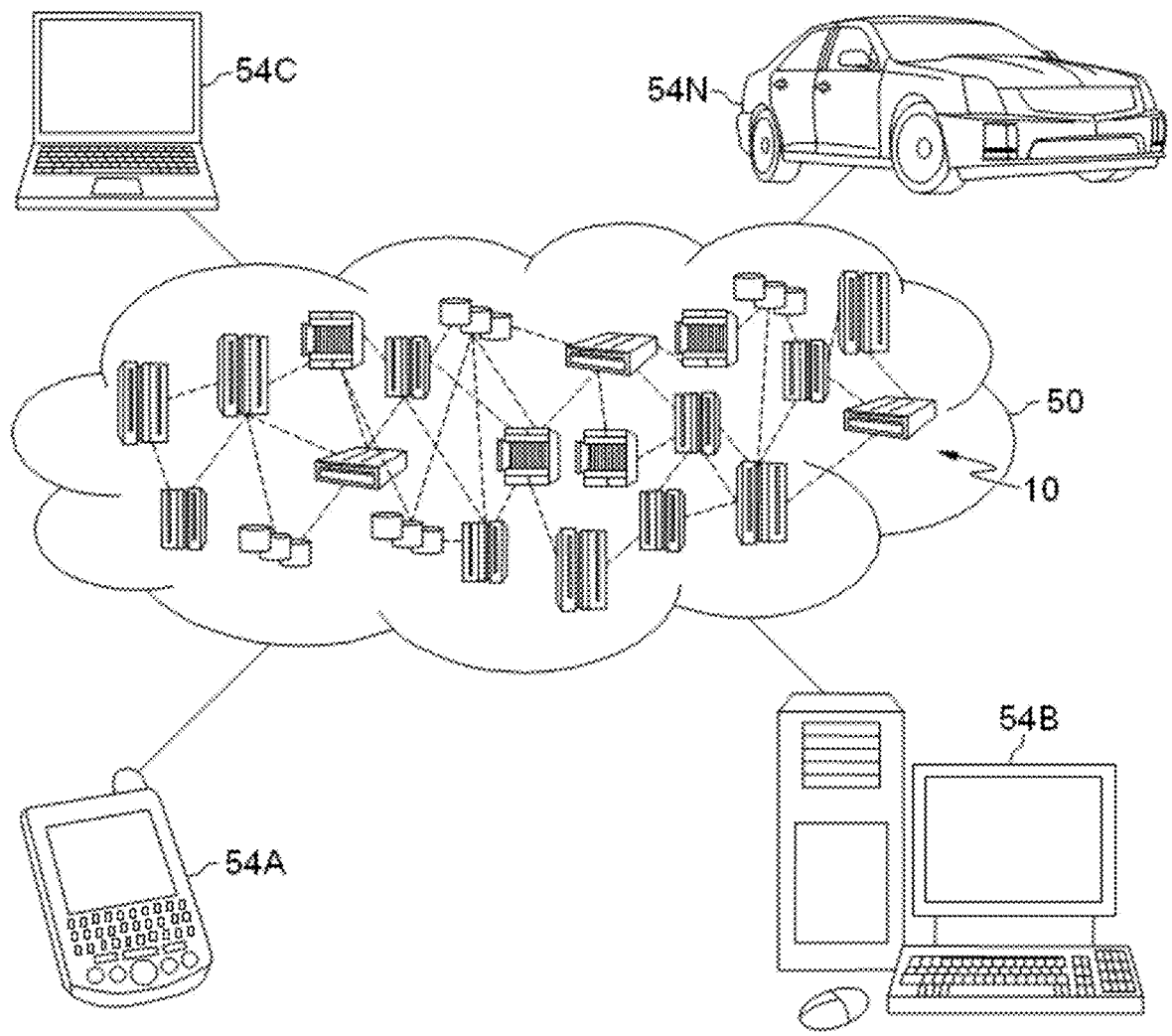
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
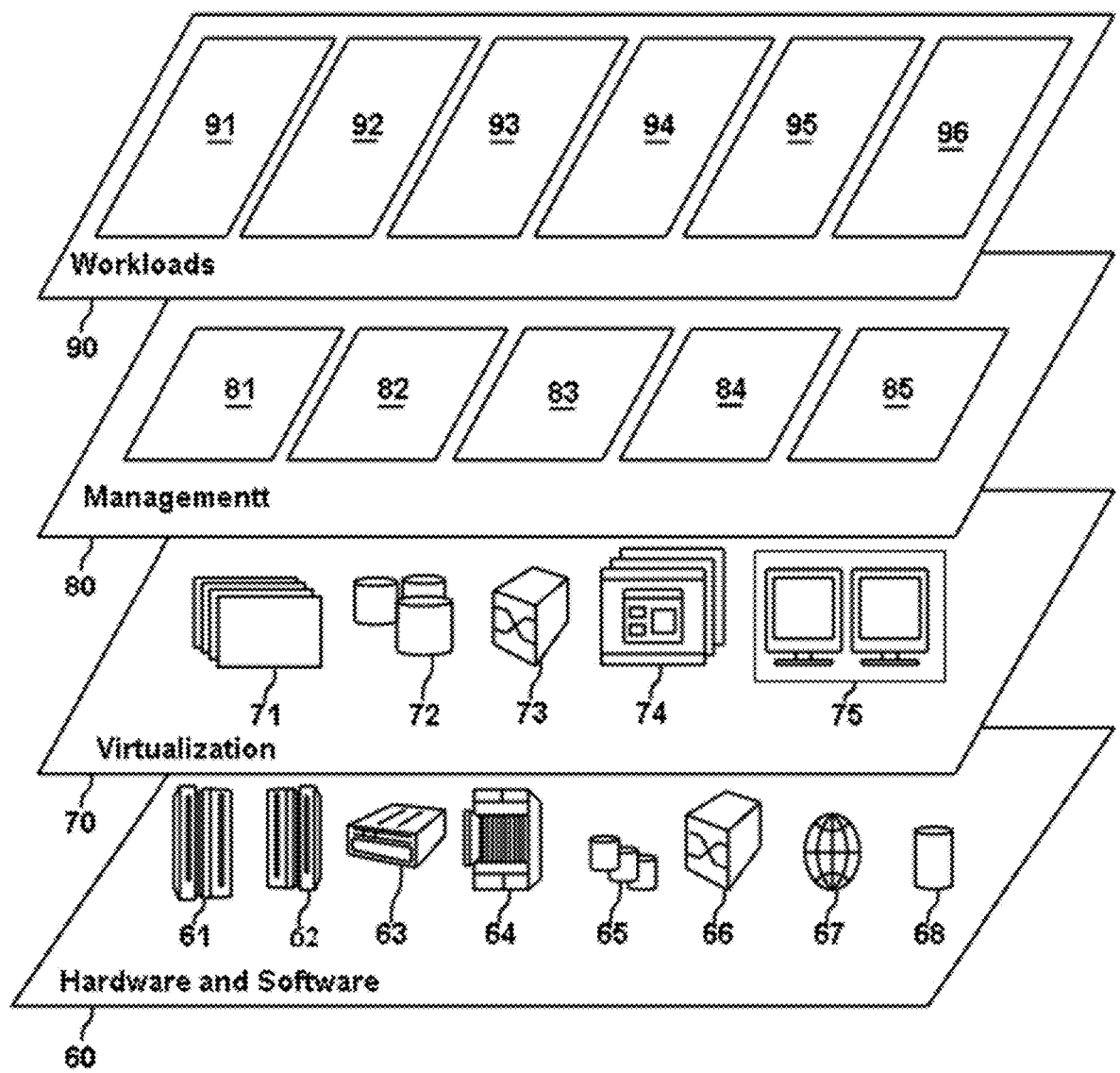
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service processing 96. Service processing 96 may implement a solution which involves obtaining a messaging request from a client, wherein the messaging request is to be routed to one of nodes in a cluster; parsing the messaging request to determine whether it should be routed to other one of the nodes in the cluster; and causing the messaging request to be routed to the other one of the nodes in response to a determination that the messaging request should be routed to the other one of the nodes in the cluster.

Figure 4:
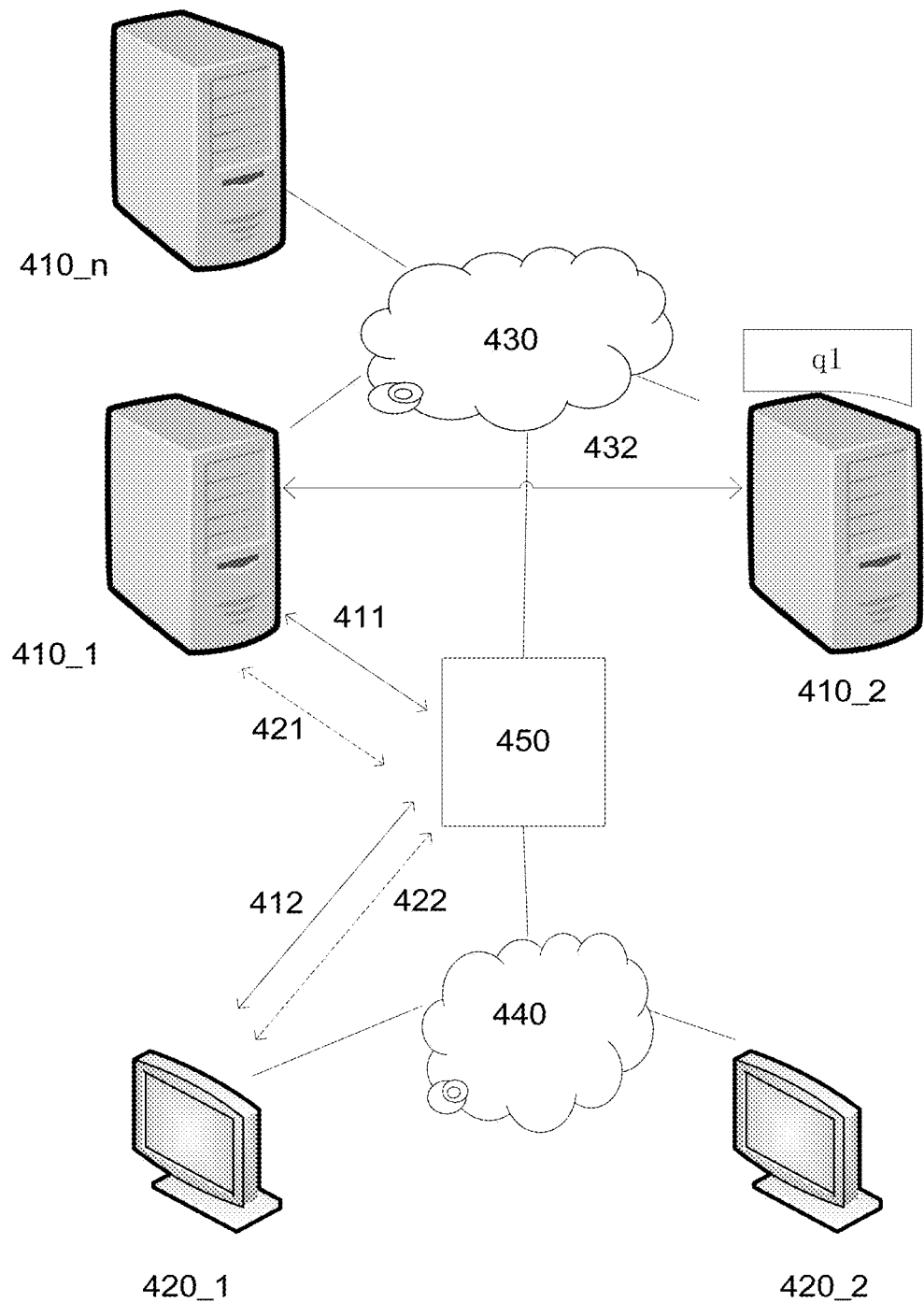
FIG. 4 illustratively shows conventional operations of a message queue system.
Figure 6:
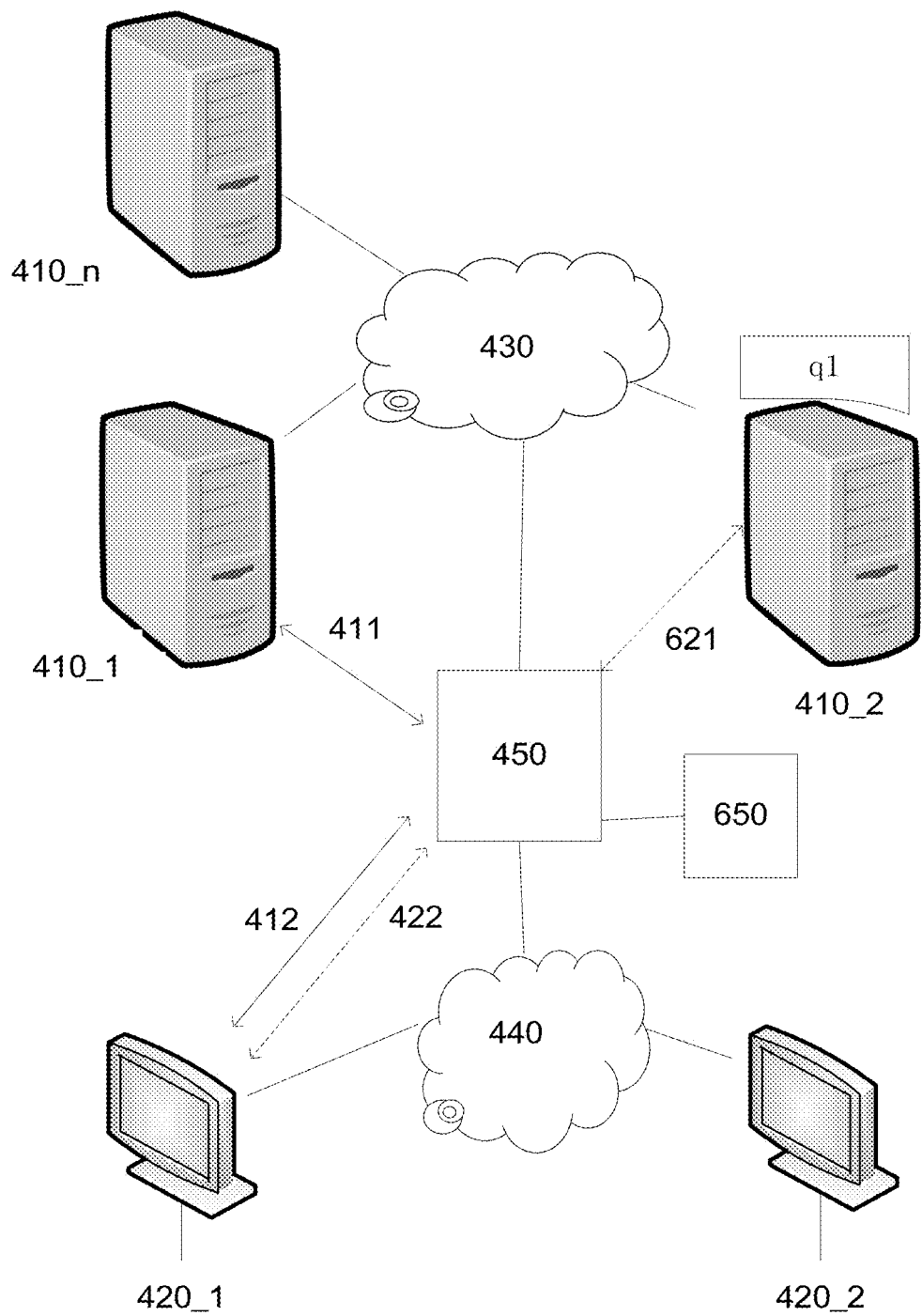
FIG. 6 illustratively shows operations of a message queue system according to an embodiment of the invention.

With reference now to FIG. 4 to FIG. 6, exemplary embodiments of the present invention will be described. The exemplary embodiments are directed to a method, system and computer program product for operating a message queue cluster having multiple nodes.

It should be noted that the processing of the method for operating a message queue cluster having multiple nodes according to embodiments of this disclosure could be implemented by computer system/server 12 of FIG. 1.

Now refer to FIG. 4, which illustratively shows conventional operations of a message queue cluster.

FIG. 4 depicts a message queue cluster having multiple computing nodes 410_1, 410_2 . . . 410_n. The computing nodes (also referred to as "nodes" hereinafter) may interact with each other via a network 430. The nodes may be of any type of computing device, such as desk computer, server computer, and the like, as illustrated in FIG. 2.

FIG. 4 also shows two client devices 420_1 and 420_2 representing a plurality of client devices external to the message queue cluster (also referred to as "cluster" hereinafter). The client devices (also referred to as "clients" hereinafter) may access to nodes in the cluster via a network 440. Likewise, the clients may be of any type of computing device, such as those illustrated in FIG. 2.

FIG. 4 also shows a load balancer (LB) 450 which is communicatively coupled to nodes 410_1, 410_2, . . . , 410_n via network 430. Those skilled in the art will recognize that the one of the functions of LB 450 is to balance the work load among nodes 410_1, 410_2, . . . , 410_n.

An example of such a message queue cluster is the widely used RabbitMQ™ cluster implementing the Advanced Message Queuing Protocol (AMQP). The RabbitMQ™ cluster is a distributed system having multiple nodes, where messages are stored in queues maintained on different nodes. For each type of message, there is a master queue maintained on a master queue node, also referred to as "queue master node" in the art. If a client external to the cluster which has a network connection with a node in the cluster needs to consume a message, for example, the client sends a messaging request to the node. Then the node needs to communicate with a master queue node on which a corresponding master queue is resident in order to retrieve the message. The master queue node might not be the node to which the client is connected and to which the request is to be sent. For the purpose of illustration, hereinafter it is presumed that the message queue cluster depicted FIG. 4, as well as FIG. 6 which will be described below in detail, is a RabbitMQ™ cluster implementing the Advanced Message Queuing Protocol (AMQP).

Those skilled in the art shall appreciate that, for clients 420_1 and 420_2, LB 450 serves as a virtual host of the RabbitMQ™ cluster. If client 420_1, for example, registers with the RabbitMQ™ cluster, it may send a packet that encapsulates a Protocol-Header AMQP message to LB 450. LB 450 may forward the packet to node 410_1, for example, which is chosen from a pool of nodes in the cluster according to predefined criteria for load balance. After a series of interactions between client 420_1 and node 410_1 performed according to the AMQP protocol, a client-node network connection will be established between client 420_1 and node 410_1. The network connection (also referred to as "connection" hereinafter) consists of an original connection 412 between client 420_1 and LB 450, and a broker connection 411 between LB 450 and node 410_1.

In a like way, a client-node connection may be established between client 420_2 and node 410_2 (not shown) upon registration of client 420_2 with the cluster.

Those skilled in the art will recognize that, in accordance with AMQP, after the client-node connection is established for client 420_1, for example, client 420_1 may further establish a queue channel within the connection in order to handle queue transactions.

Specifically, for example, to establish a queue channel (also referred to as "channel" hereinafter where the context is clear), client 420_1 may firstly send a request to LB 450. The request may in the form of a "Channel.Open" AMQP message, for example. The message includes an original channel identifier?ID?422 within original connection 412. LB 450 then sends to node 410_1 the message with an additional broker channel ID 421 within broker connection 411. If the request is validated by node 410_1, then the channel is established. As shown in FIG. 4, the channel consists of original channel 422 within original connection 412 and broker connection 421 within broker connection 411.

More than one queue channel may be established within the network connection for client 420_1 in this way.

In a like way, one or more such queue channels may be established for client 420_2.

As noted above, in the RabbitMQ™ cluster, messages are stored in queues. Each queue is associated with a type of message. For each type of message, there may be a plurality of queues containing duplicated messages. The queues reside on different nodes, but only one of them is designated as master queue. The node on which the master queue resides is called master queue node (MQN). As depicted in FIG. 4, assume q1 is a master queue residing on node 410_2, and thus node 410_2 is the master queue node for master queue q1. For the purpose of illustration, the assumption will persist throughout the present description.

Those skilled in the art shall appreciate that, in accordance with AMQP, although a master queue may be mirrored to part or all of other nodes in the cluster, all queue transactions relating to the master queue will be coordinated only by the MQN on which the master queue resides. For example, client 420_1 can only consume messages retrieved from master queue q1 on MQN 410_2, even if master queue q1 might have been mirrored to node 410_1. This is illustrated by an example process of the following operations, which is may be performed if client 420_1 needs to consume a message <msg_A>.

Operation_1: Client 420_1 will send a messaging request for message <msg_A> to LB 450 via channel 422.

Those skilled in the art shall appreciated that, in the case of RabbitMQ™ cluster implementing AMQP, the messaging request is also referred to as AMQP message request, as will be used in the description below.

Operation_2: LB 450 will forwards the AMQP message request to node 410_1 via channel 421.

Operation_3: Node 410_1 will parse the request to identify the master queue node that stores the master queue corresponding to message <msg_A>. In the instant case, the master queue node is identified to be MQN 410_2. So, LB 450 will transmit the request to master queue node 410_2.

Operation_4: MQN 410_2 will retrieve <msg_A> from master queue q1 stored in its local storage and return <msg_A> retrieved to node 410_1.

Operation_5: Node 410_1 will send <msg_A> to LB 450.

Operation_6: LB 450 will send <msg_A> to client 420_1.

In the above process, Operation_3 and Operation_4 involve inner-cluster traffic between node 410_1 and MQN 410_2, including transmitting transmit the request from node 410_1 to MQN 410_2 and returning <msg_A> from MQN 410_2 to node 410_1. The inner-cluster traffic is illustratively denoted by line 432 in FIG. 4.

The inner-cluster traffic incurs cost of network bandwidth in network 430. It would be advantageous if the traffic is reduced or avoided. To this aim, it is contemplated that AMQP message requests be forwarded to corresponding master queue nodes directly from LB 450 via channels established from LB 450 to the master queue nodes.

Next, embodiments of the invention will be described in detail with further reference to FIG. 5 and FIG. 6.

FIG. 5 is a flowchart of the general process of a computer-implemented method 500 for operating a message queue cluster having multiple nodes according to embodiments of the invention. Generally, method 500 comprises Step 510, Step 520 and Step 530. Steps 510 involves obtaining a messaging request from a client, by one or more processors, wherein the messaging request is to be routed to one of nodes in a cluster. Step 520 involves parsing, by one or more processors, the messaging request to determine whether the messaging request should be routed to other one of the nodes in the cluster. And Step 530 involves causing, by one or more processors, the messaging request to be routed to the other one of the nodes in response to a determination that the messaging request should be routed to the other one of the nodes in the cluster. Those skilled in the art shall recognize that Step 510, Step 520 and Step 530 represent a portion of the total processing for the operation of the message queue cluster. Integration of these steps with the overall methods of operation of the cluster to perform additional functions with respect to the cluster is merely a matter of design choices. Further, those skilled in the art shall appreciate that a variety of equivalent methods and techniques may be implemented for the operation of message queue systems with configuration and protocol similar or equivalent to the exemplary cluster.

As shown in FIG. 5, according to an embodiment of the invention, method 500 starts at Step 510, prior to which the RabbitMQ™ cluster has been initialized at Step 505, with information required with respect to nodes in the cluster, network connections established for clients and channels established within each connection are collected and readily accessible for use in subsequent processing.

According to an embodiment of the invention, the information about nodes in the RabbitMQ™ cluster may include the data as shown in Table_1 below, for example.

TABLE_1

| Nodes | | |
|---|---|---|
| Node | Node IP | Status |
| 410_1 | 10.0.0.101 | Active |
| 410_2 | 10.0.0.102 | Active |
| ... | ... | ... |

The column under the table header "Node" contains identifiers of a pool of nodes in the RabbitMQ™ cluster. The column under the table header "Node IP" and "Status" respectively contains IP addresses and status of the nodes. From Table_1 it may be seen that node 410_1, for example, is active and its IP address is 10.0.0.101.

According to an embodiment of the invention, the information about network connections may include the data as shown in Table_2 below, for example.

TABLE_2

| Client-Node Network Connection | | | | |
|---|---|---|---|---|
| Client-Node Connection | Original Connection ID | Client IP | Broker Connection ID | Node IP |
| <420_1, 410_1> | 412 | 172.0.0.1 | 411 | 10.0.0.101 |
| <420_2, 410_2> | OCN2 | 172.0.0.2 | BCN2 | 10.0.0.102 |
| ... | ... | ... | ... | |

In Table_2, the column under the table header "Client-Node Connection" contains connections established between clients, 420_1 and 420_2, and respective nodes, 410_1, 410_2 ... , 410_n. The column under the table header "Original Connection ID" contains unique identifiers (IDs) of original connections between clients, 420_1 and 420_2, and LB 450. Here, "412" represents an original connection between client 420_1 and LB 450, which is also denoted by a line 412 in FIG. 4. And "OCN2" represents an original connection between client 420_2 and LB 450 (not shown in FIG. 4). The column under the table header "Broker Connection ID" contains unique identifiers of broker connections between LB 450 and respective nodes 410_1, 410_2 ... , 410_n. Here, "411" represents a broker connection between LB 450 and client 420_1, which is also denoted by a line 411 in FIG. 4. And "BCN2" represents a broker connection between LB 450 and client_410_2 (not shown in FIG. 4).

As an alternative or in addition to the original connection ID and the broker connection ID, IP addresses of relevant entities may be recorded in Table_2. For example, Table_2 additionally includes IP addresses of clients and nodes. As shown in Table_2, the column under the table header "Client IP" contains IP addresses of clients. Here, the IP address of client 420_1 is "172.0.0.1" and the IP address of client 420_2 is "172.0.0.2". And the column under the table header "Node IP" contains IP addresses of nodes. Here, the IP address of node 410_1 is "10.0.0.101" and the IP address of node 410_2 is "10.0.0.102".

Thus, it may be seen that original connection 412 is a connection between IP address "172.0.0.1" and the IP address (not shown) of LB 450, and broker connection 411 is a connection between "10.0.0.101" and the IP address of LB 450.

For the purpose of illustration, hereinafter, it is assumed that a connection has been established between client 420_1 and node 410_1, as shown by line 411 and line 412. Similarly, another connection has been established between client 420_2 and node 410_2 via LB 450, though it is not explicitly shown in FIG. 4 for simplicity.

According to an embodiment of the invention, the information about queue channel may include the data as shown in Table_3_1 below, for example.

TABLE_3_1

| queue channel for client 420_1 | | | |
|---|---|---|---|
| Original Channel ID | Original Connection ID | Broker Channel ID | Broker Connection ID |
| 422 | 412 | 421 | 411 |
| ... | 412 | ... | 411 |

In Table_3_1, the column under the table header "Original Connection ID" contains the unique identifier, "412", of the original connection between client 420_1 LB 450. The column under the table header "Broker Connection ID" contains the unique identifier, "411", of the broker connection between LB 450 and node 410_1. The column under the table header "Original Channel ID" contains unique identifiers of original channels established within original connection 412. Here, it is illustratively shown only original channel "422" within original connection 412, which is also denoted by a dotted line 422 in FIG. 4. The column under the table header "Broker Channel ID" contains unique identifiers of broker channels established within broker connection 411. Here, it is illustratively shown only one broker channel "421" within broker connection 411, which is also denoted by a dotted line 421 in FIG. 4. From FIG. 4 it may be seen that the channel between client 420_1 and node 410_1, which consists of original channel 422 and broker channel 421, is established within the connection between client 420_1 and node 410_1 which consists of original connection 412 and broker connection 411.

Refer now to FIG. 6, which illustratively shows operations of a RabbitMQ™ cluster according to embodiments of the invention. The elements included in FIG. 6 are same as those shown in FIG. 4, except for a component 650 which is a module designed to operate in conjunction with LB 450 to realize features of the invention. Specifically, component 650 may be configured to execute the steps of method 500 that will be described in greater detail below.

Referring now back to FIG. 5, Step 510 involves obtaining a messaging request from a client, wherein the messaging request is to be routed to one of nodes in a cluster.

According to an embodiment of the invention, the messaging request is to be routed to one of nodes in a cluster via an established channel between the client and the one of the nodes. The established channel comprises a first channel established between the client and a load balancer of the cluster and a second channel established between the load balancer and the one of the nodes, and wherein the causing the messaging request to be routed to the other one of the nodes in the cluster comprises causing the messaging request to be routed to the master queue node via the first channel and a master channel established between the load balancer and the master queue node.

Assume that client 420_1, for example, sends a messaging request. In the case of the example described above with reference to FIG. 4, the messaging request is an AMQP message request. In response, Step 510 is triggered. As noted above, prior to Step 510, original channel 422 and broker channel 421 have been established within the client-node connection between client 420_1 and node 410_1. According to the AMQP protocol, the AMQP message request would be sent to LB 450 via original channel 422 prior to reaching node 410_1 via broker channel 421. Thus, component 650 of FIG. 6, which operates in conjunction with LB 450, may obtain the request from LB 450 before it reaches node 410_1.

Following Step 510, Step 520 involves parsing the messaging request obtained in Step 510 to determine whether the messaging request should be routed to other one of the nodes in the cluster.

According to an embodiment of the invention, said parsing the messaging request to determine whether the messaging request should be routed to other one of the nodes in the cluster comprises determining whether the other one of the nodes is a master queue node in the cluster that stores a master queue corresponding to the messaging request. In other words, a determination may be made as to whether there is a master queue node in the cluster that stores a master queue corresponding to the messaging request. If the master queue node is other one of the nodes instead of the node to which the request is to be routed, the messaging request should be routed to the other one of the nodes.

In the context of RabbitMQ™ cluster application, there are basically two kinds of AMQP message requests that may be made by clients. One is Produce request and the other is Consume request. A Produce request asks to store a message into a master queue. A Consume request asks to use or consume a message stored in a master queue. According to the AMQP protocol, an AMQP message request includes information on whether the request asks to consume a message or produce a message, as well as a type of the message. For ease of description, it is assumed that the AMQP message request is a Consume request sent by client 420_1 for using a message in master queue q1 residing on node 410_2.

Conventionally, the AMQP message request may be parsed by a node in the RabbitMQ™ cluster, for example, in Operation_3 performed by node 410_1 as noted above. According to an embodiment of the invention, component 650 may perform the parse based on the information comprised in the request in a like manner. As a result of the parsing, it is determined that other one of the nodes, node 410_2, is the master queue node containing master queue, q1.

Following Step 520, Step 530 involves causing the messaging request to be routed to the other one of the nodes in response to a determination that the messaging request should be routed to the other one of the nodes in the cluster.

In the instant case, node 410_2 is determined to be the master queue node containing q1. Therefore, the AMQP message request should be redirected to master queue node 410_2. Component 650 may do so by causing LB 450 to forward the request to node 410_2 instead of node 410_1, although there is already broker channel 421 established within the network connection between client 420_1 and node 410_1.

Specifically, as noted above, prior to Step 510, a queue channel is already established within a network connection that has been established between client 420_1 and node 410_1. The established channel consists of two channels. The first channel is original channel 422 between client 420_1 and load balancer 450. The second channel is broker channel 421 between load balancer 450 and node 410_1. Normally, the AMQP message request sent by client 420_1 would be routed to node 410_1 via the established channel between client 420_1 and node 410_1, or via the first channel and the second channel. However, according to an embodiment of the invention, in Step 530 the AMQP message request is redirected to node 410_2 by keeping the first channel and "replacing" the second channel, broker channel 421, with a master channel 621 established between LB 450 and the master queue node, node 410_2, as shown in FIG. 6.

According to an embodiment of the invention, component 650 may establish the master channel 621 between LB 450 and the master queue node in response to master queue q1 being built on master queue node 410_2.

Those skilled in the art shall appreciate that, according to the AMQP protocol, a master queue is designated on a node that firstly gets a queue declare message. For example, if client 420_2 produces a message for which there is not an associated master queue, the client may send an AMQP message request in the form of the queue declare message to LB 450 which will forward it to node 410_2 via the queue channel already established between client 420_2 and node 410_2. An associated master queue, q1, will be built and stored on node 410_2 which firstly gets the queue declare message. Therefore, node 410_2 will become the master queue node that hosts the associated master queue, q1, in the instant case. Those skilled in the art shall appreciate that the queue declare message may be obtained by component 650 from LB 450. Component 650 may parse the queue declare message or otherwise to know that node 410_2 will become the master queue node that hosts the associated master queue q1. In response, Component 650 may establish the master channel 621 between LB 450 and the master queue node, or node 410_2. In this way, component 650 may establish individual master channels between LB 450 and respective master queue nodes in the cluster. The master channels may be stored in a table and used for use in redirecting AMQP message requests to respective master queue nodes.

According to an embodiment of the invention, where the AMQP message request is to consume a message, method 500 further comprises causing the load balancer to receive the message retrieved from the master queue on the master queue node via the master channel; and then forward the message received to the client via the original channel. For example, after receiving the AMQP message request redirected to it, master queue node 410_2 will retrieve the message from master queue q1 and send it to LB 500 via master channel 621. LB 500 will receive the retrieved message and forward it to client 420_1 via the first channel, original channel 422.

The processing and the effect of method 500 may readily be understood from FIG. 6. In FIG. 6, line 421 as denoted in FIG. 4 disappears, which means the AMQP message request will not be sending to node 410_1 via channel 421. Rather, it will be sending to MQN 410_2 via master channel 621. In FIG. 6, line 432 as denoted in FIG. 4 disappears, meaning that the inner-cluster traffic between node 410_1 and node 410_2 due to the AMQP message request is avoided.

Embodiments of the inventions have been described above by using a RabbitMQ™ cluster implementing Advanced Message Queuing Protocol as an example. However, the principle of the invention is by no means limited to the example. As noted above, those skilled in the art shall appreciate that, as design choices, a variety of equivalent or alternative methods and techniques in accordance with the principle of the invention may be implemented for the operation of message queue systems with configuration and protocol similar or equivalent to the exemplary RabbitMQ™ cluster. Therefore, those design choices shall be construed as falling into the scope and spirit of the invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for the purpose of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method of operating a message queue cluster having multiple nodes comprising:
   obtaining, by one or more processors, a messaging request from a client, wherein the messaging request is to be routed to one of multiple nodes in a cluster;
   routing the messaging request to one of multiple nodes in a cluster without an intermediary device;
   parsing, by one or more processors, the messaging request to determine whether the messaging request should be routed to an other one of the multiple nodes in the cluster; and
   routing the messaging request to the other one of the multiple nodes, by one or more processors, in response to a determination that the messaging request should be routed to the other one of the multiple nodes in the cluster.

2. The computer-implemented method of claim 1, wherein parsing the messaging request to determine whether the messaging request should be routed to the other one of the multiple nodes in the cluster comprises determining whether the other one of the multiple nodes is a master queue node in the cluster that stores a master queue corresponding to the messaging request.

3. The computer-implemented method of claim 2, wherein the messaging request is to be routed to the one of multiple nodes via a first channel established between the client and a load balancer of the cluster and a second channel established between the load balancer and the one of the multiple nodes, and wherein the causing the messaging request to be routed to the other one of the multiple nodes in the cluster comprises causing the messaging request to be routed to the master queue node via the first channel and a master channel established between the load balancer and the master queue node.

4. The computer-implemented method of claim 3, wherein the first channel and the second channel are within a network connection that has been established between the client and the one of the multiple nodes.

5. The computer-implemented method of claim 4, wherein the network connection comprises a first network connection between the client and the load balancer and a second network connection between the load balancer and the one of the multiple nodes, and wherein the first channel is built within the first network connection and the second channel is built within the second network connection.

6. The computer-implemented method of claim 2, wherein the messaging request is to consume a message, the method further comprising causing the load balancer to:
   receive the message retrieved from the master queue in the master queue node via the master channel; and
   forward the received message to the client via the first channel.

7. The computer-implemented method of claim 3, wherein the master channel is established between the load balancer and the master queue node in response to the master queue being built on the master queue node.

8. The computer-implemented method of claim 1, wherein the cluster is a RabbitMQ™ cluster implementing Advanced Message Queuing Protocol.

9. A system for operating a message queue cluster having multiple nodes comprising:
   one or more processors; and
   a computer-readable memory coupled to the one or more processors, the computer-readable memory comprising instructions that when executed by the one or more processors perform actions of:
   obtaining a messaging request from a client, wherein the messaging request is to be routed to one of multiple nodes in a cluster via an established channel between the client and the one of the multiple nodes;
   routing the messaging request to one of multiple nodes in a cluster without an intermediary device;
   parsing the messaging request to determine whether the messaging request should be routed to an other one of the multiple nodes in the cluster; and
   routing the messaging request to the other one of the multiple nodes in response to a determination that the messaging request should be routed to the other one of the multiple nodes in the cluster.

10. The system of claim 9, wherein parsing the messaging request to determine whether the messaging request should be routed to the other one of the multiple nodes in the cluster comprises determining whether the other one of the multiple nodes is a master queue node in the cluster that stores a master queue corresponding to the messaging request.

11. The system of claim 10, wherein the messaging request is to be routed to the one of multiple nodes via a first channel established between the client and a load balancer of the cluster and a second channel established between the load balancer and the one of the multiple nodes, and wherein the causing the messaging request to be routed to the other one of the multiple nodes in the cluster comprises causing the messaging request to be routed to the master queue node via the first channel and a master channel established between the load balancer and the master queue node.

12. The system of claim 11, wherein the first channel and the second channel are within a network connection that has been established between the client and the one of the multiple nodes.

13. The system of claim 12, wherein the network connection comprises a first network connection between the client and the load balancer and a second network connection between the load balancer and the one of the multiple nodes, and wherein the first channel is built within the first network connection and the second channel is built within the second network connection.

14. The system of claim 10, wherein the messaging request is to consume a message, the computer-readable memory further comprising instructions that perform actions of causing the load balancer to:
   receive the message retrieved from the master queue in the master queue node via the master channel; and
   forward the received message to the client via the first channel.

15. A computer program product for operating a message queue cluster having multiple nodes comprising a computer readable storage medium having program instructions embodied therewith, the program instructions executable by a processor to cause the processor to perform actions of:
   obtaining a messaging request from a client, wherein the messaging request is to be routed to one of multiple nodes in a cluster via an established channel between the client and the one of the multiple nodes;
   routing the messaging request to one of multiple nodes in a cluster without an intermediary device;
   parsing the messaging request to determine whether the messaging request should be routed to an other one of the multiple nodes in the cluster; and
   routing the messaging request to the other one of the multiple nodes in response to a determination that the messaging request should be routed to the other one of the multiple nodes in the cluster.

16. The computer program product of claim 15, wherein parsing the messaging request to determine whether the messaging request should be routed to the other one of the multiple nodes in the cluster comprises determining whether the other one of the multiple nodes is a master queue node in the cluster that stores a master queue corresponding to the messaging request.

17. The computer program product of claim 16, wherein the messaging request is to be routed to the one of multiple nodes via a first channel established between the client and a load balancer of the cluster and a second established channel between the load balancer and the one of the multiple nodes, and wherein the causing the messaging request to be routed to the other one of the multiple nodes in the cluster comprises causing the messaging request to be routed to the master queue node via the first channel and a master channel established between the load balancer and the master queue node.

18. The computer program product of claim 17, wherein the first channel and the second channel are within a network connection that has been established between the client and the one of the multiple nodes.

19. The computer program product of claim 16, wherein the network connection comprises a first network connection between the client and the load balancer and a second network connection between the load balancer and the one of the multiple nodes, and wherein the first channel is built within the first network connection and the second channel is built within the second network connection.

20. The computer program product of claim 17, wherein the messaging request is to consume a message, the method further comprising causing the load balancer to:
   receive the message retrieved from the master queue in the master queue node via the master channel; and
   forward the message received to the client via the first channel.

* * * * *